H. L. DIXON.
GLASS FURNACE.
APPLICATION FILED FEB. 17, 1911.

1,002,375.

Patented Sept. 5, 1911.

3 SHEETS—SHEET 3.

WITNESSES

INVENTOR
H. L. Dixon,
by Bakewell, Byrnes & Parmelee,
his Attys

UNITED STATES PATENT OFFICE.

HENRY L. DIXON, OF KNOXVILLE, PENNSYLVANIA.

GLASS-FURNACE.

1,002,375.  Specification of Letters Patent.  Patented Sept. 5, 1911.

Original application filed March 1, 1910, Serial No. 546,586. Divided and this application filed February 17, 1911. Serial No. 609,254.

*To all whom it may concern:*

Be it known that I, HENRY L. DIXON, of Knoxville, Allegheny county, Pennsylvania, have invented a new and useful Improvement in Glass-Furnaces, of which the following is a full, clear, and exact description, reference being had to the accompanying drawings, forming part of this specification, in which—

Figure 1:
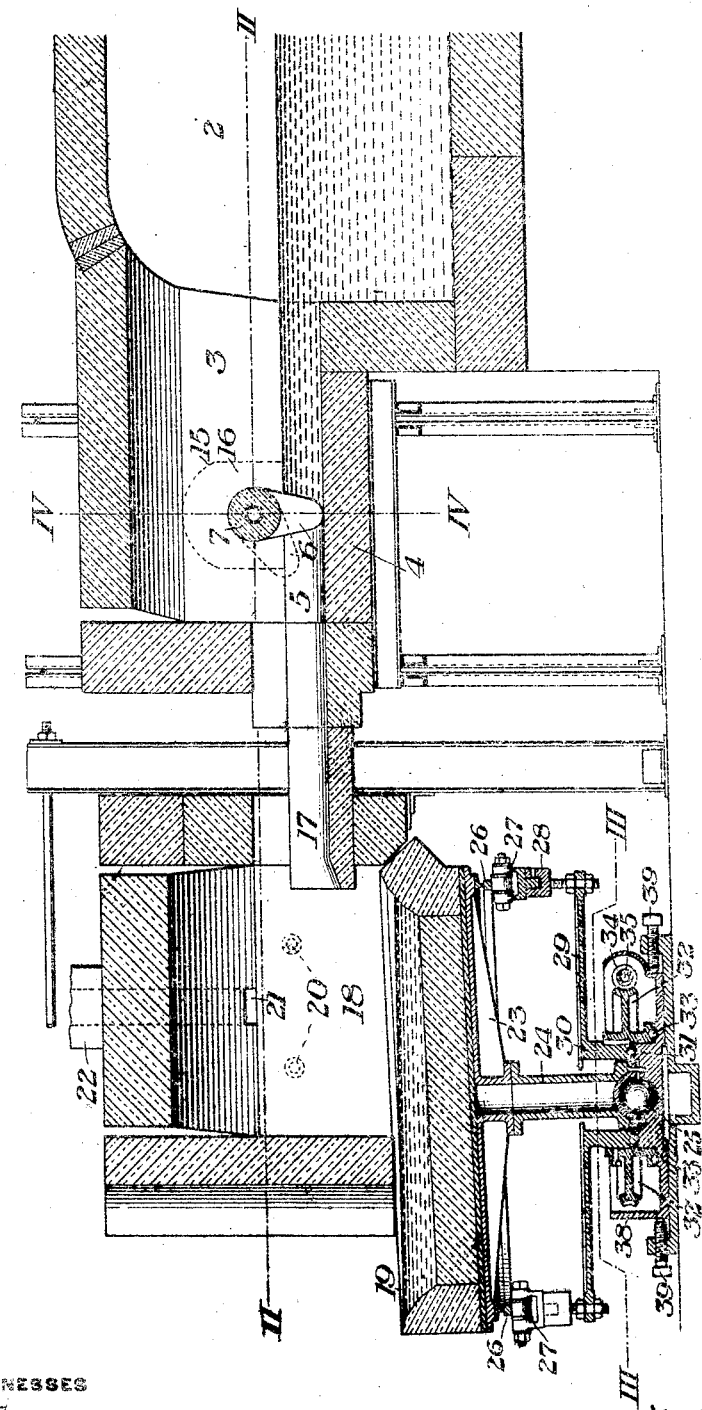
Figure 2:
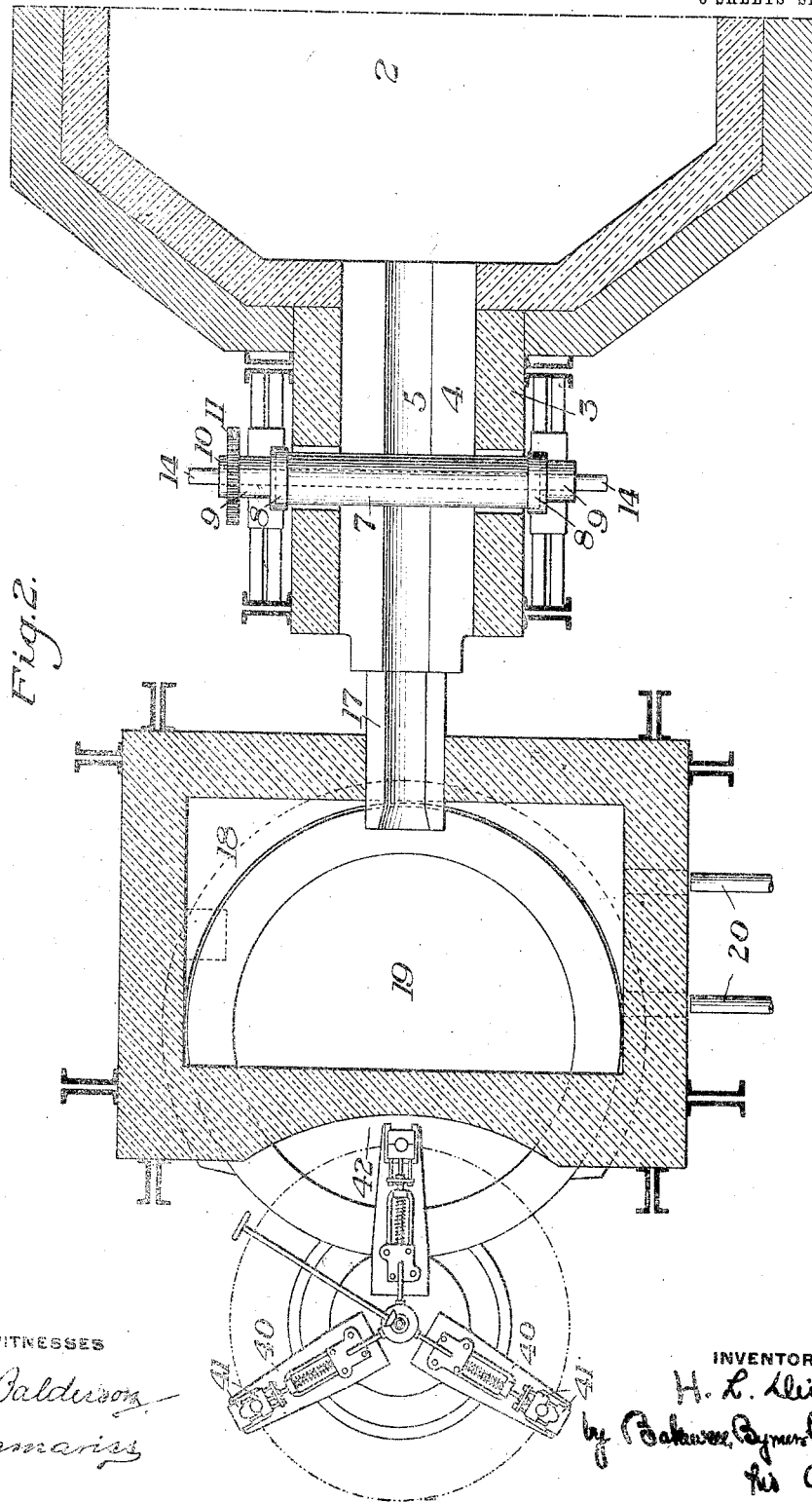
Figure 3:
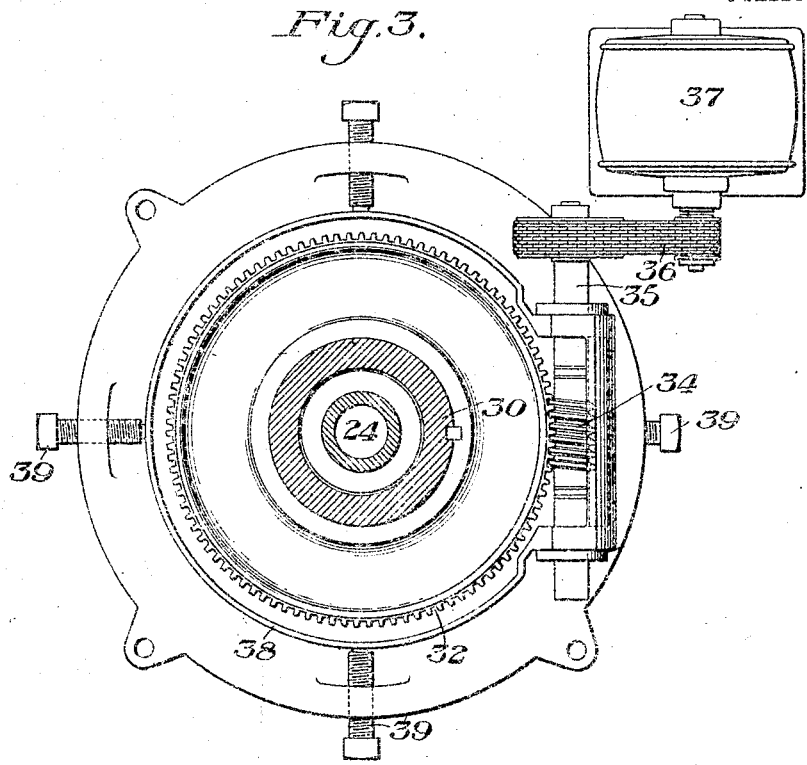
Figure 4:
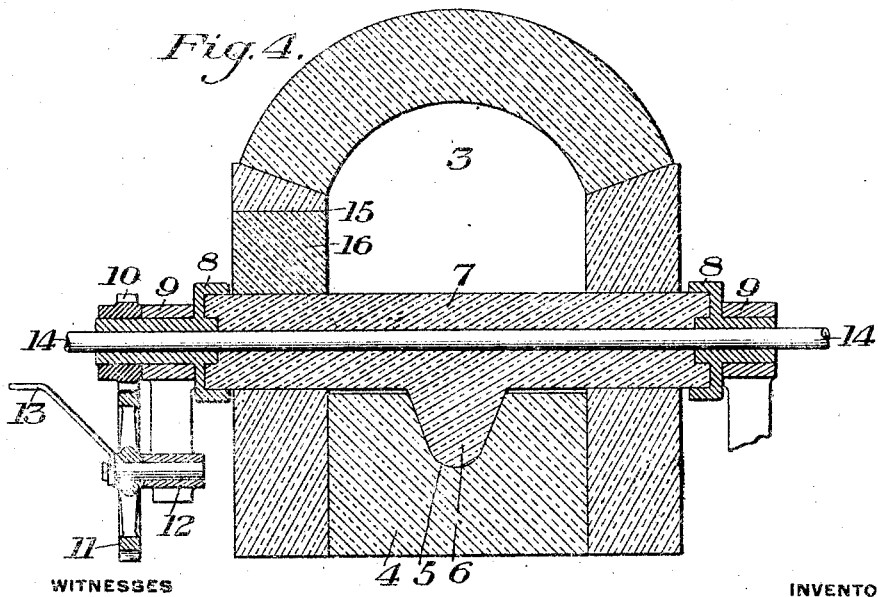

Figure 1 is a partial longitudinal vertical section showing one form of my improved furnace; Fig. 2 is a horizontal section on the line II—II of Fig. 1; Fig. 3 is a partial horizontal section on the line III—III of Fig. 1; and Fig. 4 is a cross section of the discharge end of the tank furnace on the line IV—IV of Fig. 1.

The present application is a division of my pending application Serial No. 546,586, filed March 1, 1910.

My invention is designed to provide an improved type of glass furnace, by which glass may be fed out of a tank or source of supply to a supplemental tank or reservoir in which the glass is put in circulation, without any rotation of this reservoir or movable tank.

It is also designed to provide an improved method of and means for bringing fresh gathering surfaces into position by circulating a body of glass within a receptacle or hearth.

The invention is also designed to provide an improved means for feeding, controlling and stopping the flow of glass from the tank furnace.

It also consists in the construction and arrangement of the parts, as hereinafter more fully described and claimed.

In the drawings, 2 represents a tank furnace, which may be of any desirable type, and at one end of which is a forehearth extension 3, the bottom 4 of which is considerably above the level of the tank bottom. The bottom of this forehearth extension is provided with a longitudinal channel 5, through which the flow of the glass is controlled by a stopper or dam 6, of refractory material, which fits neatly in the channel. This stopper or valve is preferably formed integral with a sleeve 7 of refractory material, which is above the level of the glass in the tank and channel, and extends through holes in the refractory side walls of the forehearth. This refractory sleeve is fastened to short shafts or trunnions 8, 8, which are rotatably mounted in bearings 9, outside the extension, and on the outer portion of one trunnion is secured a pinion 10, intermeshing with a toothed wheel 11, carried in a depending bearing 12, and actuated by handle 13. Through the center of the refractory sleeve and the bearings extends a stationary water pipe 14. Water is circulated through this pipe to cool the refractory sleeve. The water pipe is preferably a neat fit within the sleeve, so that the sleeve may rotate around it; though the pipe may be secured to the sleeve, in which case it should connect with stationary pipes by stuffing boxes.

In order to provide for removal of the shaft through the side wall, I preferably build one side wall with an opening 15, shown in Figs. 1 and 4, which is closed by filling in with removable brick work or blocks 16, as shown in Fig. 4. If the valve or dam portion is turned into an upwardly projecting position, and the trunnion portions detached, the sleeve may be drawn out through this opening.

From the end of the channel 5, a refractory spout 17 extends into a small supplemental furnace 18, which may be of any desirable form, and which covers the major portion of the gathering tank 19. The furnace may be heated by burners 20, projecting into one side thereof and discharging from flue 21, into stack 22, or in any other desirable way.

The tank 19 is mounted on a framed platform or skeleton 23, which is carried upon a gyratory shaft 24, having step bearing upon a ball 25. To the outer portion of the skeleton or platform 23 is secured a downwardly projecting annular rail 26, which contacts with a series of rollers 27, mounted on adjustable arms 28, projecting upwardly from a rotary frame or disk 29. The rotary frame 29 has a central hollow sleeve 30, resting upon ball bearings 31, around the oscillatory shaft 24, and to the hollow shaft 30 is secured a worm wheel 32, which preferably rests on ball bearings 33. This worm wheel engages a worm 34, on shafts 35, which may be driven in any suitable manner, as by a silent chain drive 36. This drive may connect with electric motor 37, from which the motion is geared down to give the proper speed of rotation to the spider or frame 29, carrying the roller supports. I preferably inclose the driving gearing within a receptacle 38, which may contain oil so that the working parts may rotate in an oil bath. I have shown this receptacle as adjustable by means of set screws 39.

The rollers 27 are adjusted to different levels, so that the gathering tank will be tipped into an angular position. As the spider 29 is rotated, the rollers travel around on the projecting rail of the tank, and will tip it successively in different directions, the highest side following around to different points of the circumference. This is of great advantage, in that it sets up a circulation in the glass contained in the tank, without actual rotary movement of the tank itself. Fresh portions of glass are thus carried to the outer portion of the tank, which projects beyond the end wall of the supplemental furnace, and from which portion the glass is gathered and taken to the glass-forming machine.

In using the apparatus, the refractory valve or stopper is turned to allow a flow of glass through the channel and the spout into the gathering tank. After the tank has received the proper amount, the valve may be set to allow a slow flow thereinto, or may be turned to shut off the glass at intervals, the flow being thus under complete control. The glass back of the gate or stopper will be kept hot by the heat from the tank, and the refractory material of the gate will be heated by the glass itself. As the refractory sleeve is above the glass level, the glass will not flow sidewise into the holes through which it projects. As rotation is imparted preferably continuously to the roller supports beneath the gathering tank, this tank is gradually tipped in different directions, the high portion following around the circumference. As this successive tipping action takes place, the glass will flow to the depressed part of the hearth or receptacle, and thus a circular flow of the glass will be set up within the hearth, carrying fresh portions of the glass to that portion of the hearth projecting beyond the wall of the furnace. Any desirable type of gathering machine may be employed to gather successive portions of glass from this part of the hearth. In Fig. 2, I have indicated a suction gathering apparatus having three arms 40, these arms having opening and closing gathering molds 41, which successively connect with a suction pipe at the time it is in gathering position over the hearth. Each arm, therefore, will gather a portion of glass from the hearth, then travel around and be automatically opened and drop this glass into a suitable mold, preferably formed as part of a blowing or pressing machine. The end wall of the supplemental furnace may be cut away, as shown at 42, to permit the rotary movement of the gathering apparatus. Any desirable type of gathering apparatus may be employed.

The advantages of my invention result from the peculiar movement of the gathering hearth, which avoids any rotary movement thereof, but imparts a circulation to the glass of the contained bath; also from the improved type of control gate or valve, by which the flow of glass to the gathering hearth is regulated.

The most important feature of my invention is the circulating of the glass within a receptacle, without need of rotating the receptacle, in order to bring fresh gathering surfaces to the desired point or points for gathering. The circulation of the glass may be obtained in any desirable manner within the broad scope of my invention.

The receptacle may be of any desirable shape, since I consider myself the first to circulate glass within a receptacle, as distinguished from rotating the receptacle itself, in order to bring fresh surfaces into position for gathering.

Many variations may be made in the form and arrangement of the tank, the connecting channel, the gathering hearth and furnace, and the means for tipping the hearth, without departing from my invention.

I claim:

1. A non-rotary gathering hearth or tank, connections for feeding molten glass thereto, mechanism arranged to oscillate the hearth to produce a circulating movement of the glass therein, and gathering apparatus arranged to gather successive portions of glass from a point within the limits of the hearth and to which fresh glass is constantly delivered by the circulating movement of the glass; substantially as described.

2. A non-rotary gathering hearth, an inclined support on which the hearth is mounted, means for feeding molten glass to the hearth, connections for oscillating the support successively in different directions to tilt the tank and set up a circulating movement of glass therein, and gathering apparatus arranged to gather successive portions of glass from a point within the limits of the hearth and to which fresh glass is constantly delivered by the circulating movement of the glass; substantially as described.

3. A non-rotary gathering hearth, a furnace or heat-retaining cover extending over a portion only of the hearth, means for feeding molten glass to the hearth, connections arranged to oscillate the hearth to set up a circulation of the glass therein, and a gathering apparatus arranged to gather successive portions of fresh glass from the portion of the hearth beyond the cover; substantially as described.

4. In glass gathering apparatus, a tank or source of glass supply, an open-topped channel leading therefrom, and a swinging refractory gate intermediate of the length of the channel and arranged to swing longitudinally of the channel and fit therein; substantially as described.

5. In glass supplying apparatus, a tank or source of glass supply, an open-topped channel below the level of the glass, a swinging refractory gate arranged to swing longitudinally of the channel and to fit therein, and a refractory shaft extending across the channel and carrying the gate; substantially as described.

6. In glass supplying apparatus, an open-topped channel connecting with a source of glass supply, a swinging gate intermediate the length of the channel, said gate being arranged to swing longitudinally of and fit in the channel, and an oscillating water-cooled shaft carrying the gate; substantially as described.

In testimony whereof, I have hereunto set my hand.

HENRY L. DIXON.

Witnesses:
G. M. VIERS,
H. M. CORWIM.